United States Patent Office 2,859,100
Patented Nov. 4, 1958

2,859,100

PROCESS OF EXTRACTING ALUMINA FROM RAW CALCIUM ALUMINATES

Jean Charles Seailles, Paris, France

No Drawing. Application July 9, 1953
Serial No. 367,100

11 Claims. (Cl. 23—143)

The present invention relates to a process of extracting substantially pure silica-free alumina from raw calcium aluminates containing silica as an impurity.

The present application is a continuation-in-part of my patent application Serial No. 338,160, filed February 20, 1953, entitled "Extraction of Alumina from Raw Calcium Aluminates," now abandoned, which application Serial No. 338,160, filed February 20, 1953, in turn, is a continuation of my patent application Serial No. 766,899, filed August 6, 1947, entitled "Extraction of Alumina from Raw Calcium Aluminates," now abandoned; a continuation-in-part of my patent application Serial No. 308,559, filed September 9, 1952, entitled "Method for the Dissolution of Aluminates of Lime with a View to Production of Pure Alumina," now abandoned, which application Serial No. 308,559, filed September 9, 1952, in turn, is a continuation of my patent application Serial No. 764,879, filed July 30, 1947, entitled "Method for the Dissolution of Aluminates of Lime with a View to Production of Pure Alumina," now abandoned; a continuation-in-part of my patent application Serial No. 294,077, filed June 17, 1952, entitled "Method for Making a Water Solution of Raw Aluminates of Lime and its Application to the Manufacture of Alumina," now abandoned, which application Serial No. 294,077, filed June 17, 1952, in turn, is a continuation of my patent application Serial No. 11,808, filed February 27, 1948, entitled "Method for Making a Water Solution of Raw Aluminates of Lime and its Application to the Manufacture of Alumina," now abandoned; and a continuation-in-part of my patent application Serial No. 766,107, filed August 4, 1947, entitled "Process for Manufacturing and Extracting Calcium Aluminates," now abandoned.

Many processes have been proposed for the extraction of alumina from calcium aluminates. In general, all the processes are based on the treating of such aluminates in pulverized form with a caustic alkali or a sodium carbonate lye.

By this treatment the alumina of the calcium aluminates forms a soluble sodium aluminate solution, all the calcium ions remaining in the muds in the form of insoluble compounds, mainly in the form of calcium carbonate.

Despite the many variations in this basic process, there has not until now been discovered a process which will give good yields of alumina with substantial purity. All the processes until the present time have either produced insufficient yields of alumina, however containing such high quantity of silica as impurity as to render impractical the use of these processes and the use of the produced alumina on an industrial scale; or the produced alumina by processes whereby the alumina was obtained sufficiently pure for further industrial use, was obtained in such low yield as to render these processes impractical from an economic standpoint.

The previous known processes utilizing attack liquors with a high concentration of caustic alkali or alkaline carbonate, cause a high quantity of silica to be dissolved and go into the solution. Despite efforts made to eliminate this silica from the solution before precipitation of alumina therefrom, the alumina thus obtained was always too impure to be utilized commercially. Moreover, due to this high concentration of the attack liquor, costly washing of the residuary muds were necessary in order to avoid important losses of alumina and of re-agents by entrainment in the muds.

Furthermore, contrary thereto, the use in the prior art of very dilute attack liquors avoided the necessity for costly washings and allowed for a satisfactory purity in reference to the silica; however, the yield from extraction was very poor and great quantities of alumina were lost. Therefore, those processes are also inapplicable commercially.

I have discovered that in order to obtain good yields of substantially pure alumina, particularly silica-free alumina, it is necessary to regulate two major conditions of the basic process to within very strict limits, and preferably to utilize a third condition during the extraction. Only by carrying out the process within the limits which will be disclosed in the application is it possible to obtain, without being limited to the sodium compounds as leaching re-agents, high yields of about 95% and more of the soluble alumina contained in the raw calcium aluminates, the aluminate solution thus obtained being in such condition that either it is immediately ready for obtaining by precipitation alumina pure enough for further industrial use, or it may be easily purified for obtaining such a pure alumina.

It is therefore an object of the present invention to provide a process of extracting alumina from raw calcium aluminates economically in high yield and purity.

It is another object of the present invention to provide a process of extracting alumina from raw calcium aluminates whereby the specific conditions of said process may be varied within the limits disclosed to obtain greater or lesser yields of alumina according to greater or lesser degrees of purity required.

It is further another object of the present invention to provide a process of extracting alumina in high yield and purity from raw calcium aluminates, whereby the specific conditions of said process may be adjusted within the limits herein disclosed to obtain such high yield and purity, whatever may be the molecular ratio

$$\frac{CaO}{Al_2O_3}$$

of the soluble calcium aluminates contained in the raw material.

It is still another object of the present invention to provide a process of extracting alumina in high yield and purity from raw calcium aluminates by the use of relatively inexpensive materials and substantially standard conditions of temperature and pressure.

The process of extracting alumina from raw calcium aluminates containing silica as an impurity, according to the present invention, therefore comprises the treatment of the raw calcium aluminates, preferably in subdivided form, with an aqueous leaching solution containing anions which form with calcium aluminate a practically insoluble calcium compound (e. g. calcium carbonate) and cations which form with calcium aluminate a soluble aluminate (e. g. alkaline metals and ammonium aluminates), which solution contains no or only a little amount of soluble aluminate at the beginning of such treatment. In general, the most economical leaching substances are alkaline metal compounds and especially sodium carbonates which may be considered as containing their corresponding cations oxide ($Na_2O$) combined with their corresponding anions ($CO_2$) and which may be written as $Na_2O \cdot CO_2$ and $Na_2O \cdot 2CO_2 \cdot H_2O$; and therefore throughout most of the specification the invention will usually be discussed with reference to sodium carbonate and oxide, although it is to be understood that any other suitable leaching material may be utilized.

This process will be herein described for general application to raw calcium aluminates, as the commercially obtainable anhydrous calcium aluminates generally comprise, besides their usual impurities such as silica, titanium or iron oxides, etc., many types of calcium aluminates: for instance tricalcic aluminate, monocalcic aluminate, pentacalcic trialuminate. . . . However, it is of course to be understood that said process may be applied to raw materials containing only one kind of calcium aluminate.

The specific conditions of this process, at least the first two of which must be observed, are as follows:

(a) The maximum concentration in such cations of the leaching solution, and consequently of the solution throughout the entire process, must be no greater than that which is molecularly equivalent to 18.3 grams per liter of $Na_2O$. This maximum concentration is equivalent to a 0.295 mole solution, which however, for convenience shall throughout the specification be referred to as a solution which is molecularly equivalent to 18.3 grame per liter of $Na_2O$.

This concentration of solution results in the final solution having a maximum alumina concentration of 30 grams per liter (0.295 mole). Greater concentrations of alumina in the final solution interfere with the obtaining of high yields and with the purity of the resulting product. Leaching solutions containing much less than 18.3 grams per liter of $Na_2O$ may also be used, and in fact solutions containing only traces may be used. The minimum concentration of the leaching solution is only limited by practical volume and power considerations since the more dilute the solution, the greater the volume and pumping power required. In the commercial practice, the minimum concentration of the leaching solutions will be advantageously limited to a concentration molecularly equivalent to about 3 grams per liter of $Na_2O$.

(b) The second condition is the strict control of the composition and of the quantity of employed re-agents in the attack liquor with reference to the composition and quantity of the leached raw material, so as to have the proportion between the number of molecules of the cations oxides (e. g. alkaline oxides) comprised in the in-solution utilized cations compounds and the number of molecules of the soluble alumina contained in the leached raw material, i. e.

$$\frac{\text{Mole. Alkaline oxides}}{\text{Mole. soluble alumina}}$$

comprised between the limiting values 1 and 1.6, by soluble alumina contained in the raw material, being understood the alumina contained at the beginning of the extraction step in the soluble compounds and especially in the soluble calcium aluminate comprised in this raw material, the quantity of such soluble alumina being previously easily determined as further disclosed.

These limiting values, as shall be further discussed are critical for obtaining a high yield and sufficient purity.

Said above molecular proportion, for convenience, shall herein be referred to as "attack ratio" because it relates to the attack liquor, and its value characterizing the reaction medium is one of the main characteristics of the attack conditions of the raw calcium aluminate by the leaching solution.

In the commercial practice, 90 to 95% or more of the soluble alumina shall be easily extracted by my process. But sometimes, the extraction of the remaining may cause an uneconomical lengthening of the operating time in reference to the slight profits thus involved by such a small additional alumina recovery, so that the extraction shall be generally interrupted before having recovered the totality of the soluble alumina.

Consequently, the molecular proportion between the in-solution cations oxides e. g. alkaline oxides, and the alumina contained in the final solution such as it results from the extraction step, i. e.

$$\frac{\text{Alkaline oxides dissolved}}{\text{Alumina dissolved}}$$

is in practice slightly higher than the attack ratio hereabove referred to.

This second proportion shall be herein referred to as "caustic ratio" of the solution, because it is indicative of the total quantity of caustic alkali contained in the solution with reference to the quantity of alumina dissolved in the same, and its value is one of the main characteristics of such soluble aluminate solution.

Obviously, the higher the effective alumina yield of extraction, the closer the value of the caustic ratio will be to the value of the attack ratio, and when the yield of the extracted soluble alumina reaches 100% either the words "attack ratio" or the words "caustic ratio" may be used, as both ratio have thus exactly the same value.

(c) The third condition which should be adhered to, according to the preferred embodiment of the present invention, is that of maintaining dissolved in the solution, at the end of the extraction process, a quantity of CaO which is greater than that resulting from the very slight solubility of the precipitated calcium compound, i. e. according to the alkalinity of the solution, greater than 5 to 15 milligrams per liter, in the case of precipitated calcium carbonate. In order to maintain this condition, it is necessary to use slightly lesser number of gram equivalents of the calcium precipitating reacting ions compared to the number of gram equivalents of soluble CaO contained in the leached raw calcium aluminate. For instance, if one utilizes soluble carbonic anions so as to produce insoluble calcium carbonate, the molecular ratio of the used $CO_2$ to the soluble CaO of the raw material must always be slightly less than 1.

The above has the effect of causing the final solution to always contain some calcium aluminates therein, which causes a decrease in the silica content of the solution. The amount of calcium precipitating ions to be utilized, in order to maintain a slight amount of lime dissolved in the solution, depends on the amount of soluble calcium aluminates in the raw material, and on the molecular ratio $$\frac{CaO}{Al_2O_3}$$

of these aluminates which is determined in any normal manner such as by X-ray crystallography.

The condition (c) defined above, the preferred embodiment of the invention is primarily of interest in obtaining the alumina directly from the extraction process substantially silica-free. It is therefore a purity-controlling factor rather than a percentage yield controlling factor. The conditions (a) and (b) are the controlling factors as to percentage yield.

It is to be understood that the molecular attack and caustic ratios define the number of molecules of alkaline oxides in reference to the number of molecules of soluble alumina rather than any gram or percentage concentration. For example, 10 grams of raw calcium aluminates containing 40% soluble alumina when treated with a sodium carbonate solution containing 4.5 grams sodium carbonate per liter, will give the following molecular attack ratio:

$$\frac{4.5/106}{4/102} = \frac{424.5}{392} = 1.1$$

Likewise, the caustic ratio value of a potassium aluminate solution containing 24 grams of potassium oxides and 20 grams of alumina per liter, will be:

$$\frac{24/94}{20/102} = \frac{256}{196} = 1.3$$

(the CaO concentration being negligible).

Both "attack ratio" and "caustic ratio" might be considered as having in the numerator alkaline oxides plus calcium oxides contained in the solution. However, since the main part of the calcium ions in the solution is precipitated, e. g. as calcium carbonate which is only very slightly soluble, and the amount of calcium aluminate remaining in solution should be only very slight at most, with regard to the amount of alkaline aluminate which, in general, corresponds to about 15 grams per liter calculated as $Na_2O$, a very high amount in comparison to the dissolved calcium oxide, the "attack ratio" and the "caustic ratio" of the solution shall herein be considered as above defined. It is to be understood that if the leaching solution is very dilute and thus the concentration of calcium aluminate in the solution is high relatively to the alkaline aluminate concentration, so as to have an appreciable effect on the final caustic ratio, the CaO concentration might be added to the alkaline oxide concentration in order to determine the exact value of this ratio.

The basic ions which may be utilized in the process of the present invention are all those cations which form a water-soluble compound with at least one anion or acid radical which in turn is capable of reacting with calcium in the solution to form a calcium compound which is less soluble than the calcium aluminates, such basic ion being able to form one or more soluble aluminate the solution of which is sufficiently stable for the process.

The most useful cations therefore, in the order of preference, are the alkaline metals: sodium, potassium, lithium ions; cesium, rubidium ions are efficient but not commercially usable in reference to their price.

It is also possible to use ammonium ions, though the use of ammonium compounds involves technical difficulties in the process which therefore make its use less preferable than those of the alkaline metals. It is for this reason that the molecular attack and caustic ratio are defined in reference to the number of molecules of alkaline oxides rather than cation oxides. However, it is to be understood that the attack or caustic ratio generally refers to any cation rather than solely to the alkaline oxides.

On a commercial scale and even in carefully regulated conditions, a certain amount of the leaching material is lost, mainly by physical entrainment, which loss is equivalent to about 40 to 50 kilograms of sodium carbonate per ton of alumina. It is therefore much too expensive to utilize more substances other than sodium and potassium and especially rare metals, though such other substances may theoretically be utilized and therefore meant to be comprehended within the scope of the present invention.

The most suitable anions which may be utilized are carbonic, sulfuric, sulfitic and oxalic ions. Carbonic, sulfuric and sulfitic ions are the most preferred for reasons of economy and suitability with respect to the low solubility of calcium salts of these anions and the relatively good solubility of the alkali metal salts of these anions.

These anions are utilized for the most part in the form of soluble salts, preferably in the form of the salts of the above cations, though they may conveniently be utilized additionally according to a preferred embodiment of the present invention in the form of the acid itself or in the form of an acid ion-forming compound, for example, carbon dioxide or sulphur dioxide etc. or also in the form of acid salts such as bicarbonate, bisulphate etc.

Simple calculations allow for determination of the relative quantity of different materials which are utilized in the present process. For all calculations it is first necessary to know the concentration of soluble calcium aluminates in the raw material and also the ratio of soluble CaO to soluble $Al_2O_3$ in same material. This depends of course on the raw material utilized and the relative amounts of different calcium aluminates in the raw material, i. e. $CaO.Al_2O_3$, $3CaO.Al_2O_3$ and $$5CaO.3Al_2O_3$$

of which eventually a single one may be present. This may be determined either by X-ray spectral analysis which will give the soluble or insoluble compounds content of the raw material, or by the "Travers" test which is based on the quantity of the soluble compounds of CaO and $Al_2O_3$ which pass into solution in boiling water when 1 gram of the raw material is treated for 30 minutes with 1 liter of water. These techniques for determining the relative ratio of soluble CaO to $Al_2O_3$ in a raw material containing calcium aluminates, are well known.

In order to realize condition (a) it is merely necessary to choose the concentration of alkaline oxides of the initial leaching solution so that the quantity of alkaline oxides is not greater than that which is molecularly equivalent to 18.3 grams $Na_2O$ per liter, so that the final solution will contain no more than this maximum amount of equivalent of $Na_2O$ and therefore no more than a maximum of 30 grams alumina per liter.

Condition (c), the preferred embodiment of the present invention, is based on the ratio of $CaO:Al_2O_3$ of the original soluble calcium aluminates and also the quantity of calcium aluminates to be treated. Knowing this ratio it is therefore possible to control the quantity of calcium-precipitating anions, e. g. carbonic ions, in the form of the salt, the free acid, and in the form of free compounds which form the anions, e. g. $CO_2$, so that the ratio of gram equivalents of reacting anions to the gram equivalents of soluble CaO is slightly less than 1. Under these conditions the effect is achieved that a slight quantity of calcium aluminates remains in solution at the end of the extraction process, this quantity being adjustable by controlling the amount of calcium precipitating ions introduced into the solution. As a consequence, the final solution contains no free alkaline salts of acids capable of precipitating calcium.

The effect of this condition for the process according to the present invention may be of extreme importance. This condition has the effect of greatly reducing the amount of silica in the final solution, the silica impurities being replaced by calcium aluminate which can very easily be removed, whereas silica impurities are very difficult to remove without the use of high temperature and pressure and greatly without an important loss of alumina.

Although I do not wish to limit the present invention, as to any theory of how or why this condition has the desired result of greatly reducing the silica content of the final solution, the following theory is given in the hope that it will help others in the complete understanding of the present invention.

All known processes had the effect of causing the final solutions to contain substantially $CO_2$ ions and no calcium aluminate and even no CaO in solution except for the amount which corresponds to the slight solubility of the precipitated calcium carbonates remaining in the waste muds, i. e. a maximum of a few milligrams CaO per liter. These known processes had as consequences the effect of dissolving a relatively important quantity of silica as impurity in the sodium aluminate solution, and it is extremely difficult and expensive to purify a sodium aluminate solution containing much silica.

I have discovered that keeping calcium aluminate dissolved in the final alkaline (or ammonium) aluminate solution, rather than to precipitate all of the soluble calcium ions, prevents the dissolution of silica according to the common law of solubility.

The maximum concentration of calcium oxide which is to be left in solution according to this condition of the process is not a single figure since this maximum concentration varies depending on the concentration of alkali in the solution, the type of calcium aluminates, the molecular attack ratio and the resulting caustic ratio of the final solution. As a practical matter the dissolved calcium aluminates left in solution are generally not greater than the maximum solubility of the particular calcium aluminate in pure water, which, as calculated in CaO, varies for:

Tricalcium aluminate—between 300 and 500 mg. CaO/liter

Monocalcium aluminate—between 650 and 800 mg. CaO/liter

Pentacalcium trialuminate—between 700 and 1000 mg. CaO/liter

It is to be understood, however that these limits are mainly a practical consideration and the scope of the present invention is not meant to be limited thereto.

Condition (b) mentioned above determines the quantity of leaching agents to be utilized for a given quantity of calcium aluminate containing a known quantity of soluble alumina. The attack ratio is always regulated so as to be between 1 and 1.6 molecules of alkaline oxides, e. g. $Na_2O$, per molecule of alumina. From this attack ratio it is possible to determine the quantity of alkaline oxides which is to be made available.

The following examples will help to understand the calculations to be made:

Assume that one takes raw calcium aluminate in which the soluble calcium aluminate, entirely attackable by the extraction solution, has a molecular ratio of $$\frac{CaO}{Al_2O_3} = 1.6$$

in other words this calcium aluminate can be considered as having the formula $1.6CaO.Al_2O_3$.

In order to transform this material into sodium aluminate by leaching with sodium carbonate, it is necessary to utilize 1.6 moles of $Na_2CO_3$ per each molecule of $Al_2O_3$ according to the following reaction:

$$1.6CaO.Al_2O_3 + 1.6(Na_2CO_3) = 1.6(CaCO_3)\downarrow + 1.6Na_2O.Al_2O_3$$

In this case the molecular attack ratio is equal to 1.6. If it is desired according to condition (b) to utilize a molecular attack ratio reduced to 1.3, it is necessary to utilize 1.3 moles of $Na_2CO_3$. However, in order to precipitate all of the calcium oxide and to lower the attack ratio to the required value, it is necessary to add a predetermined quantity of calcium precipitating ions, for example, 0.3 mole or more of $CO_2$. The following is then the reaction:

$$1.6CaO.Al_2O_3 + 1.3(Na_2CO_3) + 0.3(CO_2) = 1.6(CaCO_3)\downarrow + 1.3Na_2O.Al_2O_3$$

The molecular attack ratio is thus reduced to 1.3. It is always to be kept in mind that according to condition (a) the sodium carbonate concentration in the leaching solution must never exceed 18.3 g. $Na_2O$ so that the final solution contains a maximum of 30 g. per liter alumina.

In the same case corresponding to condition (c) above so that at the end of the operation there is in solution a quantity of CaO superior to that which corresponds to the slight solubility of calcium carbonate, it is necessary to utilize less gram equivalents of carbonic ions than the gram equivalents of CaO, in other words to utilize less than a total of 1.6 moles of $CO_2$, partly in the form of $Na_2CO_3$ and partly in the form free $CO_2$.

For example, in the preceding case 1.3 moles of $Na_2CO_3$ can be utilized but only $(0.3-x)$ moles of free $CO_2$. The reaction is then as follows:

$$1.6CaO.Al_2O_3 + 1.3(Na_2CO_3) + (0.3-x)CO_2 = (1.6-x)CaCO_3\downarrow + 1.3Na_2O.Al_2O_3 + xCaO$$

It is to be noted that the $x$ molecules of CaO are not considered in calculating the molecular attack ratio and the caustic ratio of the final solution, which are considered as being 1.3, because $x$ is so small in comparison to the quantity of $Na_2O$ that it does not affect the ratio.

In an analogous manner according to the present invention, if the ratio $$\frac{CaO}{Al_2O_3}$$

in the raw material is equal to 1.2 and if it is desired to effect the extraction with a molecular attack ratio of alkaline oxides to alumina equal to 1.4, for each molecule of alumina, $(1.2-x)$ molecules of $Na_2CO_3$ and $(0.2+x)$ molecules of sodium hydroxide are utilized according to the following reaction:

$$1.2CaO.Al_2O_3 + (1.2-x)Na_2CO_3 + (0.2+x)Na_2O = (1.2-x)CaCO_3 + 1.4Na_2O.Al_2O_3 + xCaO$$

which gives a molecular attack and caustic ratio of 1.4.

It may be seen from the above equations that there are mainly two types of agents to utilize in this extraction process.

The first type of agent, which shall be herein referred to as the primary leaching agent has the main effect of forming from the calcium aluminate and of substituting thereto, more soluble alumina compounds, such as alkaline aluminate. The substances that are preferred as primary agent are substances selected from the group consisting of the alkaline metal and ammonium salts of the calcium precipitating acids generally used in the process, and such as alkaline metal or ammonium carbonate, sulphate, sulphite and so on.

The other type of agent which shall herein be referred to as a secondary leaching agent has, as main purpose the adapting to a selected value comprised between 1 and 1.6 of the molecular attack ratio, in reference to the molecular ratio $$\frac{Soluble\ CaO}{Soluble\ Al_2O_3}$$

of the raw material.

The secondary leaching agents for lowering the attack molecular ratio are preferably free calcium precipitating acids, or substances forming such acids such as carbon dioxide, sulphur dioxide, sulphuric acid, carbonic acid, etc., and also the acid salts such as alkaline bicarbonate, bisulphate, etc., which may be used for that purpose to a certain extent, since these salts will free only 1 gram equivalent of alkaline oxide for each 2 gram equivalents of CaO precipitated from the solution.

The secondary leaching agents for raising the molecular attack ratio are preferably substances such as alkaline metal oxide or hydroxide or any compounds capable to form, when contacted with water, alkaline metal hydroxide such as the metal itself or any alkaline metal salts of weak acids such as alkaline sulphide. The addition of such substances will increase the alkaline oxide content of the solution without precipitating any CaO, the soluble alumina amount remaining constant.

The above equations also illustrate the flexibility of the process of the present invention which permits it to be adapted to the desired molecular attack ratio between 1 and 1.6 while utilizing the desired dilution of leaching solution and while maintaining CaO in solution so as to minimize the dissolution of silica therein.

The flexibility of operation is extremely important in allowing the process to be adapted for all conditions of extraction and for all possible values for the ratio of $$\frac{Soluble\ CaO}{Soluble\ Al_2O_3}$$

of the raw material because this ratio can vary considerably. One of the great inconveniences of the old processes resides in the fact that these processes are adaptable only for a single raw material having a determined ratio of $$\frac{CaO}{Al_2O_3}$$

the processes giving very poor results with different raw materials.

The limits of the molecular attack ratio between 1 and 1.6 are the extreme limits between which it is possible to choose the particular value of molecular attack ratio to be utilized in the extraction of alumina from a raw calcium aluminate according to the process of the present invention. I have found, however, that with most raw materials the molecular attack ratio is advantageously chosen to be between the limits 1.10 and 1.50 and most preferably between 1.15 and 1.40. Simple preliminary tests allow for a determination of the particular molecular attack ratio to be utilized for any particular raw material.

Similarly the maximum concentration of the leaching solution is molecularly equivalent to 18.3 g. per liter of $Na_2O$. However, this value is advantageously lowered to 15.25 grams per liter and most preferably to 12.20 grams per liter, all calculated as $Na_2O$, these values corresponding to maximum alumina concentrations in the final solution of 25 g. per liter and 20 g. per liter, respectively. The amount of silica impurity is lower with more dilute solutions. In each case it is necessary to choose the maximum concentration of leaching solution based on the raw material utilized, the optimum concentration being compatible with the result desired, which can be easily established by preliminary laboratory experiments.

The fineness of the raw material has a certain degree of importance. For example, utilizing raw calcium aluminate, 98% of the particles of which can pass through a 200 mesh screen (equivalent to a maximum particle size of 80 microns), and with a slag containing between $\frac{1}{10}$ and $\frac{1}{20}$ alumina in an insoluble form, the extraction process according to the present invention results in a yield of 78–80% of the total alumina, whereas utilizing the same raw material and the same slag wherein the particles can pass through a 300 mesh screen (equivalent to a maximum particle size of 50 microns), all other conditions being the same, a yield of 88–90% of the total alumina is obtained.

The temperature is mainly of importance with reference to the duration of the operation. For example, utilizing $5CaO.3Al_2O_3$, a maximum particle size of 50 microns and equal agitation, it requires 12 hours for complete dissolution of the alumina at room temperature and only ¼ hour at a temperature of 100° C. In practice, a temperature of about 75° C. and a duration of the extraction of about 1 hour is utilized because this temperature is the optimum for other purposes in the process and it is desirable to maintain the same temperature throughout the circuit. A pressure not exceeding the atmospheric pressure may be utilized throughout the process.

The condition (c) above described, namely to keep dissolved calcium aluminates in the solution, is mainly controlling as to the purity and therefore is of greater importance and more necessary with the use of higher molecular attack ratios, namely ratios above 1.30. The condition (c) can also be utilized with lower ratios.

I have also discovered, and it is also part of my invention, that for leaching such raw calcium aluminate possessing the most generally hydraulic setting properties and therefore having in the presence of leaching liquor a tendency to coagulate into clots coated with an insoluble hydraulic cement skin, being thus for its most part, isolated from the liquor, the preferred method of carrying out the extraction process consists in simultaneously grinding and digesting said raw material while in suspension in the whole of the alkaline attack liquor.

Such a treatment prevents the formation of, or removes such coating from the raw material particles, and increases the conversion of soluble calcium aluminate to alkaline aluminate, improving thus the yield and lowering further the time of the extraction step. For instance the increase of yield obtained by extracting alumina from a blast furnace slag containing 29% to 30% $Al_2O_3$, having a fineness of about 90% of particles smaller than 60 microns, by using a ball mill placed before a digesting tank, has been between 10 and 20%, in reference to the yield of the leaching in the digesting tank alone. Likewise, the time of the extraction with the ball mill has been of 1 hour and a few minutes, against 2 hours with the tank alone.

It is interesting to note that the time of the grinding has been only of a few minutes: between 3 and 10, and that the amount of alumina extracted during these few minutes, has reached 80 to 85% of the total amount of the alumina extracted.

It is to be noted that such a procedure is quite different from the usual method of wet grinding of a solid such as for instance the one which is used in the cement industry for wet grinding the mixture of limestone and clay. For, in such usual wet grinding procedure, the water contained in the slurry is reduced as much as possible to about 40%.

On the contrary, in the alumina extraction from raw calcium aluminate according to my invention, the proportion between liquid and solid is different, varying, according to the composition of the raw material and the conditions of the process, between 10 grams of solid per liter when leaching a raw material containing much alumina with a very dilute solution, and 250 grams of solid per liter when leading a raw material having the lowest content of alumina with a solution of the highest possible concentration, the average being usually between 50 and 150 g./l., the wet grinding usual procedure treating at least 500 or 600 g. of solid for 500 or 400 g. of water, i. e. 1000 or 1500 g. of solid per liter of water.

The sodium aluminate solution obtained after the extraction process, which is sufficiently free of silica impurities for further processing, may be converted to alumina by any customary method. The alumina is precipitated from the alkaline aluminate solution in the form of the hydrate of alumina either by hydrolysis or by acid precipitation. In the latter case the acid utilized for the precipitation of the alumina may be the same as that utilized for the precipitation of the insoluble calcium salt, the slight quantities of calcium remaining in the solution due to the solubility of the calcium salt of the acid are not precipitated in the course of the precipitation of the alumina.

It is to be noted that there may be a relatively high amount of calcium aluminates present in the silica-free alkaline aluminate solution. The calcium aluminates in the silica-free alkaline aluminate solution may be simply converted to alkaline aluminate by precipitation of an insoluble calcium salt such as calcium carbonate, by addition of any calcium precipitating anion, for instance by means of a salt such as alkaline or ammonium carbonate. In general any method may be utilized for the removal of the calcium from the silica-free alkaline aluminate solution, the most preferred method being to react the calcium aluminate with a soluble salt which forms on double decomposition with said calcium aluminate an insoluble calcium compound and a soluble aluminate such as an alkaline or ammonium aluminate. After treatment of said substantially silica and lime free alkaline aluminate solution to precipitate alumina therefrom, the precipitate obtained is practically pure alumina hydrate.

The following examples are given as illustrative of preferred embodiments of the extraction process according to the present invention. However, it is to be understood that the scope of the present invention is not meant to be limited to the examples given.

*Example 1.—Extraction of alumina from raw calcium aluminates by means of sodium and carbonic ions with the addition of $CO_2$ during the operation*

A sample of raw calcium aluminates (aluminous blast furnace slag) was taken having the following composition determined by gravimetric and crystallographic methods (X-ray analysis):

Gravimetric:
| | |
|---|---|
| $SiO_2$ | 14.15%. |
| $Al_2O_3$ | 30.00%. |
| CaO | 53.15%. |
| $TiO_2$ | 1.25%. |
| MnO+FeO | 0.30%. |
| S | 1.00%. |
| Alkali | 0.20%. |

Crystallographic:
| | |
|---|---|
| $2CaO.SiO_2$ | 35.70% insoluble. |
| $2CaO.Al_2O_3.SiO_2$ (gehlenite) | 8.00% insoluble. |
| $5CaO.3Al_2O_3$ | 48.30% soluble. |
| $CaO.Al_2O_3$ | 2.80% soluble. |
| $CaO.TiO_2$ | 2.12% insoluble. |
| CaS | 2.25% soluble. |

The above X-ray analysis indicates 90% of the alumina to be in the form of soluble alumina and the raw material to have a molecular ratio $$\frac{\text{Soluble CaO}}{\text{Soluble Al}_2\text{O}_3} = 1.62$$

Tests by means of boiling water (according to Travers) also indicate 90% of the alumina to be soluble and the molecular ratio $$\frac{\text{Soluble CaO}}{\text{Soluble Al}_2\text{O}_3} = 1.72$$

by reason of the solubility and hydrolysis of calcium sulphide.

60 g. of this pulverized raw material containing thus about 16.2 g. soluble alumina, is treated for 1½ hours at a temperature of 60–70° by 1 liter of an alkaline solution containing 22.6 g. $Na_2CO_3$, corresponding to 13.30 g. $Na_2O$ per liter and to an attack ratio=1.35 with an addition of $CO_2$ introduced in the gaseous state, 2.5 g. of which have reacted.

For 18 g. total alumina and about 16.2 g. soluble alumina in the amount of raw material treated, the extraction obtains, with a 99% yield, 16 g. alumina in the alkaline aluminate solution having a molecular caustic ratio $$\frac{\text{Na}_2\text{O}}{\text{Al}_2\text{O}_3} = 1.37$$

The solution contains:

| | G. |
|---|---|
| $Al_2O_3$ | 16 |
| $SiO_2$ | 0.006 |
| CaO | 0.100 |
| $Na_2O$ | 13.300 |
| S | 0.600 |

After removal of the dissolved lime and after carbonation of the liquor results in alumina hydrate containing less than 0.05% $SiO_2$ (based on dry weight) and less than 0.020% CaO (based on dry weight) with a yield of 89.5% of the total alumina and 97% of the soluble alumina contained in the raw material.

*Example 2.—Extraction by means of sodium and carbonic ions supplemented by bicarbonate ions*

65 g. of the same raw material as in Example 1 is agitated with 0.720 liter of alkaline liquor containing 16.3 g. $Na_2CO_3$ and 9.85 g. $NaHCO_3$ (equivalent to 18.3 g. $NaO_2$ per liter), the attack ratio being thus 1.24.

A sodium aluminate liquor is obtained having a molecular caustic ratio $$\frac{\text{Na}_2\text{O}}{\text{Al}_2\text{O}_3} = 1.25$$

and containing:

| | |
|---|---|
| $Al_2O_3$ | 17 g. equivalent to 23.6 g. per liter. |
| $SiO_2$ | 0.008 g. equivalent to 0.011 g. per liter. |
| CaO | 0.050 g. equivalent to 0.070 g. per liter. |
| $Na_2O$ | 12.650 g. equivalent to 17.650 g. per liter. |
| S | 0.600 g. equivalent to 0.830 g. per liter. | from which it is possible to precipitate 16.5 g. alumina containing less than 0.050% $SiO_2$ from the 19.50 g. total alumina and 17.5 g. soluble alumina in the raw material, i. e. with a yield of 85% of the total alumina and 94% of the soluble alumina.

*Example 3.—Extraction by means of sodium and carbonic ions supplemented by sodium ions in the form of NaOH*

A calcium silico aluminate resulting from the manufacture of sulphuric acid obtained by the calcination of calcium sulphate in the presence of a siliceous bauxite, has the following composition:

| | Percent |
|---|---|
| $Al_2O_3$ | 29.00 |
| $SiO_2$ | 7.35 |
| $Fe_2O_3$ | 15.20 |
| $TiO_2$ | 1.20 |
| CaO | 46.35 |
| S | 0.90 |
| | 100.00 |

X-ray crystallographic analysis indicates the following composition:

| | |
|---|---|
| $2CaO.SiO_2$ | 21.40% insoluble. |
| $2CaO.SiO_2.Al_2O_3$ | 2.05% insoluble. |
| $5CaO.3Al_2O_3$ | 15.50% soluble. |
| $CaO.Al_2O_3$ | 31.80% soluble. |
| $2CaO.Fe_2O_3$ | 25.80% insoluble. |
| $CaO.TiO_2$ | 2.00% insoluble. |
| CaS | 2.00% soluble. | which indicates 97% of the alumina to be soluble which is in conformity with the boiling water test according to Travers. The ratio $$\frac{\text{CaO}}{\text{Al}_2\text{O}_3}$$

of the soluble calcium aluminates is 1.23. The boiling water test indicates the ratio $$\frac{\text{Soluble CaO}}{\text{Soluble Al}_2\text{O}_3} = 1.30$$

a slightly higher value due to the solubility of the CaS.

69 g. of this pulverized raw material is treated with 1 liter alkaline liquor containing 24.5 g. $Na_2CO_3$ per liter (equivalent to 14.30 g. $Na_2O$ per liter) to which is added 2.80 g. $Na_2O$ in the form of solid caustic alkali $Na_2O$ or sodium hydroxide NaOH, or sodium sulphide $Na_2S$, in the course of or at the end of the operation, preferably immediately after the raw material have been contacted with the liquor. The calculated molecular attack ratio was thus: 1.45. After agitation for 1½ hours, a liquor is obtained having a molecular caustic ratio $$\frac{\text{Na}_2\text{O}}{\text{Al}_2\text{O}_3} = 1.46$$

and containing:

| | G. |
|---|---|
| $Al_2O_3$ | 18.700 |
| $Na_2O$ | 16.700 |
| $SiO_2$ | 0.006 |
| CaO | 0.133 |
| S | 0.060 | which upon removal of the calcium and precipitation of the alumina, yields 95–96% of the alumina in the raw material of substantially pure alumina hydrate, containing 0.040% $SiO_2$ and 0.040% CaO calculated on dry basis.

Example 4.—Extraction of alumina from raw calcium aluminates utilizing sulfurous ions 64.2 g. raw calcium aluminates containing calcium aluminates and having the following composition:

|   | G. |
|---|---|
| SiO₂ | 9.19 |
| Al₂O₃ | 18.02 |
| CaO | 34.05 |
| SO₂ | 1.03 |
| TiO₂ | 0.81 |
| MnOFeO | 0.19 |
| S | 1.14 |
| Alkali | 0.13 | were treated, the molecular attack ratio being 1.20, with a liter of an alkaline liquor containing 25.4 g. Na₂SO₃ per liter (equivalent to 12.5 g. Na₂O per liter) with addition of gaseous SO₂ 3.15 g. of which were reacting. The operation takes 1 hour at a temperature of 60–80° C. The resulting sodium aluminate liquor has a molecular caustic ratio $$\frac{Na_2O}{Al_2O_3} = 1.20$$

and contains:

|   | G. |
|---|---|
| Al₂O₃ | 16 |
| SiO₂ | 0.006 |
| CaO | 0.390 |
| Na₂O | 11.700 |
| S | 0.600 |

Example 5.—Extraction of alumina utilizing bisulphite

The same raw material as in Example 5 is treated as in Example 5 utilizing, however, a mixture of sodium sulphite and sodium bisulphite containing 12.50 g. Na₂O and 15.85 g. SO₂ per liter. The results obtained are exactly the same as in Example 5.

The muds obtained from the extraction operation in both Examples 5 and 6 contain the following composition based on the dry weight:

|   | Percent |
|---|---|
| SiO₂ | 14.20 |
| Al₂O₃ | 3.11 |
| CaO | 52.90 |
| SO₂ | 26.30 |
| TiO₂ | 1.28 |
| MnO+FeO | 0.19 |
| Alkalis | 1.07 |
| S | 0.84 |

After addition of CaSO₄ and SiO₂ followed by calcination, a Portland cement is obtained and the SO₂ recovered may be recycled.

Example 6.—Extraction of alumina from raw calcium aluminates by means of potassium and carbonic ions with the addition of CO₂ during the operation A sample of raw calicum aluminates (aluminous blast furnace slag) was taken having the following composition determined by gravimetric method:

| Gravimetric: | Percent |
|---|---|
| SiO₂ | 14.15 |
| Al₂O₃ | 30.00 |
| CaO | 53.15 |
| TiO₂ | 1.25 |
| MnO+FeO | 0.30 |
| S | 1.00 |
| Alkali | 0.20 |

Tests by means of boiling water (according to Travers) indicate 90% of the alumina to be soluble and the molecular ratio $$\frac{Soluble\ CaO}{Soluble\ Al_2O_3} = 1.72$$

60 g. of this pulverized raw material containing thus about 16.2 g. soluble alumina, is treated for 1½ hours at a temperature of 60–70° C. by 1 liter of an alkaline solution containing 29.5 g. K₂CO₃, corresponding to 13.30 g. Na₂O per liter and to an attack ratio=1.35 with an addition of CO₂ introduced in the gaseous state, 2.5 g. of which have reacted.

For 18 g. total alumina and about 16.2 g. soluble alumina in the amount of raw material treated, the extraction obtains, with a 99% yield, 16 g. alumina in the alkaline aluminate solution having a molecular caustic ratio $$\frac{K_2O}{Al_2O_3} = 1.37$$

The solution contains:

|   | G. |
|---|---|
| Al₂O₃ | 16 |
| SiO₂ | 0.006 |
| CaO | 0.100 |
| K₂O | 20.200 |
| S | 0.600 |

After removal of the dissolved lime and after carbonatation of the liquor results in alumina hydrate containing less than 0.05% SiO₂ (based on dry weight) and less than 0.020% CaO (based on dry weight) with a yield of 89.5% of the total alumina and 97% of the soluble alumina contained in the raw material.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing substantially pure alumina having a low silica content from calcium aluminate containing silica as an impurity, comprising the steps of leaching an anhydrous calcium aluminate selected from the group consisting of CaO.Al₂O₃, 3CaO.Al₂O₃ and 5CaO.3Al₂O₃ with a dilute aqueous solution of an inorganic alkali metal salt the alkaline cations of which salt react with the Al₂O₃ of said calcium aluminate to form soluble alkaline aluminate and the anions of which salt react with the CaO of said calcium aluminate to form a calcium compound less soluble than said calcium aluminate, said alkaline cations being in said solution in an amount molecularly equivalent to between 3–18.3 grams Na₂O per liter; adjusting the amount of said cations and said anions in said solution with respect to said calcium aluminate to correspond to the equivalent of between 1–1.6 moles of Na₂O per mole of Al₂O₃ of said calcium aluminate and to have present less anions than the amount necessary to react with all of said CaO of said calcium aluminate so as to form an aqueous aluminate solution containing calcium aluminate in solution, said calcium aluminate in solution preventing the dissolution of silica in solution, thereby obtaining an aqueous aluminate solution substantially free of silica; and recovering substantially pure silica-free alumina from said solution.

2. A method of producing substantially pure alumina having a low silica content from calcium aluminate containing silica as an impurity, comprising the steps of leaching an anhydrous calcium aluminate selected from the group consisting of CaO.Al₂O₃, 3CaO.Al₂O₃ and 5CaO.3Al₂O₃ with a dilute aqueous solution of an inorganic alkali metal salt selected from the group consisting of alkali metal carbonates, sulfates, sulfites and oxalates the alkaline cations of which salt react with the Al₂O₃ of said calcium aluminate to form soluble alkaline aluminate and the anions of which salt react with the CaO of said calcium aluminate to form a calcium compound less soluble than said calcium aluminate, said alkaline cations being in said solution in an amount molecularly equivalent to between 3–18.3 grams $Na_2O$ per liter; adjusting the amount of said cations and said anions in said solution with respect to said calcium aluminate to correspond to the equivalent of between 1–1.6 moles of $Na_2O$ per mole of $Al_2O_3$ of said calcium aluminate and to have present less anions than the amount necessary to react with all of said CaO of said calcium aluminate so as to form an aqueous aluminate solution containing calcium aluminate in solution, said calcium aluminate in solution preventing the dissolution of silica in solution, thereby obtaining an aqueous aluminate solution substantially free of silica; and recovering substantially pure silica-free alumina from said solution.

3. A method of producing substantially pure alumina having a low silica content from calcium aluminate containing silica as an impurity, comprising the steps of leaching an anhydrous calcium aluminate selected from the group consisting of $CaO.Al_2O_3$, $3CaO.Al_2O_3$ and $5CaO.3Al_2O_3$ with a dilute aqueous solution of sodium carbonate so as to form sodium aluminate and calcium carbonate, the sodium ions of said sodium carbonate being in said solution in an amount molecularly equivalent to between 3–18.3 grams $Na_2O$ per liter; adjusting the amount of sodium and carbonate ions in said solution with respect to said calcium aluminate to correspond to the equivalent of between 1–1.6 moles of $Na_2O$ per mole of $Al_2O_3$ of said calcium aluminate and to have present less carbonate ions than the amount necessary to react with all of said CaO of said calcium aluminate so as to form an aqueous aluminate solution containing calcium aluminate in solution, said calcium aluminate in solution preventing the dissolution of silica in solution, thereby obtaining an aqueous aluminate solution substantially free of silica; and recovering substantially pure silica-free alumina from said solution.

4. A process according to claim 1 in which anions in addition to said anions from said alkali metal salt are introduced in the form of gases which form with water free acids the anions of which react with the CaO of said calcium aluminate to form a calcium compound less soluble than calcium aluminate.

5. A process according to claim 1 in which free acids the anions of which react with the CaO of said calcium aluminate to form a calcium compound less soluble than calcium aluminate are introduced in addition to said alkali metal salt.

6. A process according to claim 1 in which anions are introduced in the form of acid salts the anions of which react with the CaO of said calcium aluminate to form a calcium compound less soluble than calcium aluminate.

7. A process according to claim 1 in which alkaline cations are introduced in the form of free alkaline oxides.

8. A process according to claim 1 in which free alkali metal hydroxides are introduced in addition to said alkali metal salt.

9. A process according to claim 3 in which carbonate ions are introduced in the form of carbon dioxide.

10. A process according to claim 3 in which carbonate ions are introduced in the form of a soluble bicarbonate.

11. A process according to claim 3 in which carbonate ions are introduced in the form of an ammonium salt selected from the group consisting of ammonium carbonate and ammonium bicarbonate.

References Cited in the file of this patent

UNITED STATES PATENTS

| | | |
|---|---|---|
| 1,591,365 | Cowles | July 6, 1926 |
| 1,618,105 | Pedersen | Feb. 15, 1927 |
| 1,856,194 | Seailles | May 3, 1932 |
| 1,971,354 | Scheidt et al. | Aug. 28, 1934 |
| 1,978,823 | Stohr | Oct. 30, 1934 |
| 2,058,145 | Folger | Oct. 20, 1936 |
| 2,242,258 | Noll | May 20, 1941 |
| 2,351,941 | Dyckerhoff | June 20, 1944 |
| 2,544,231 | Hollum et al. | Mar. 6, 1951 |

FOREIGN PATENTS

| | | |
|---|---|---|
| 252,399 | Great Britain | June 9, 1927 |
| 632,079 | Great Britain | Nov. 16, 1949 |
| 637,578 | Great Britain | May 24, 1950 |
| 648,248 | Great Britain | Jan. 3, 1951 |